(12) United States Patent
Larsen et al.

(10) Patent No.: US 7,855,724 B2
(45) Date of Patent: *Dec. 21, 2010

(54) TRANSITIONING BETWEEN TWO HIGH RESOLUTION IMAGES IN A SLIDESHOW

(75) Inventors: Tonni Sandager Larsen, Descanso, CA (US); Koji Matsubayashi, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,242

(22) Filed: Aug. 13, 2008

(65) Prior Publication Data

US 2008/0297517 A1 Dec. 4, 2008

Related U.S. Application Data

(63) Continuation of application No. 10/728,058, filed on Dec. 3, 2003, now Pat. No. 7,468,735.

(51) Int. Cl.
*G09G 5/00* (2006.01)

(52) U.S. Cl. .................. 345/629; 345/428; 715/730

(58) Field of Classification Search .................. None
See application file for complete search history.

(56) References Cited

U.S. PATENT DOCUMENTS

| | | | |
|---|---|---|---|
| 4,827,344 A | 5/1989 | Astle et al. | |
| 5,326,266 A | 7/1994 | Fisher et al. | |
| 5,353,391 A | 10/1994 | Cohen et al. | |
| 5,359,712 A | 10/1994 | Cohen et al. | |
| 5,371,519 A | 12/1994 | Fisher | |
| 5,475,812 A | 12/1995 | Corona et al. | |

(Continued)

FOREIGN PATENT DOCUMENTS

JP   2000136906   5/2000

(Continued)

OTHER PUBLICATIONS

Eric Vera, "Flash MX Tutorials", Feb. 2002, Meacromedia, Inc., First Edition, p. 29-36.

(Continued)

*Primary Examiner*—Kee M Tung
*Assistant Examiner*—David Chu
(74) *Attorney, Agent, or Firm*—Rader, Fishman & Grauer PLLC

(57) ABSTRACT

A method of transitioning between two high resolution images in a slideshow includes replacing a first image with a lower resolution copy of that first image and fading out the lower resolution copy of the first image to reveal a second image. A system for transitioning between two high resolution images in a slideshow includes a video chip having a first video buffer for containing a first image, a second video buffer for containing a second image, and a graphic buffer for containing a lower resolution copy of the first image. The chip is configured to replace the first image with the lower resolution copy of the first image and fade out the lower resolution copy of the first image to reveal the second image.

27 Claims, 5 Drawing Sheets

U.S. PATENT DOCUMENTS

| | | | |
|---|---|---|---|
| 5,781,188 | A | 7/1998 | Amiot et al. |
| 5,859,623 | A | 1/1999 | Meyn et al. |
| 5,935,197 | A | 8/1999 | Aldworth |
| 6,005,969 | A | 12/1999 | Thomas et al. |
| 6,078,349 | A | 6/2000 | Molloy |
| 6,078,617 | A | 6/2000 | Nakagawa et al. |
| 6,248,944 | B1 | 6/2001 | Ito |
| 6,367,933 | B1 | 4/2002 | Chen et al. |
| 6,396,500 | B1 | 5/2002 | Qureshi et al. |
| 6,483,609 | B1 | 11/2002 | Ueno et al. |
| 6,721,361 | B1 | 4/2004 | Covell et al. |
| 6,738,075 | B1 | 5/2004 | Torres et al. |
| 6,976,229 | B1 | 12/2005 | Balabanovic et al. |
| 7,102,643 | B2 | 9/2006 | Moore et al. |
| 7,113,183 | B1 | 9/2006 | Collins et al. |
| 7,298,928 | B2 * | 11/2007 | Huang et al. .............. 382/299 |
| 2001/0005434 | A1 | 6/2001 | Noguchi et al. |
| 2002/0069218 | A1 | 6/2002 | Sull et al. |
| 2002/0094026 | A1 | 7/2002 | Edelson |
| 2002/0113898 | A1 | 8/2002 | Matsuhashi |
| 2002/0149578 | A1 | 10/2002 | Atkins |
| 2002/0152462 | A1 | 10/2002 | Hoch et al. |
| 2002/0154140 | A1 | 10/2002 | Tazaki |
| 2002/0159632 | A1 * | 10/2002 | Chui et al. .............. 382/168 |
| 2002/0178278 | A1 | 11/2002 | Ducharme |
| 2003/0002715 | A1 | 1/2003 | Kowald |
| 2003/0012402 | A1 | 1/2003 | Ono |
| 2003/0025836 | A1 | 2/2003 | An et al. |
| 2003/0063090 | A1 | 4/2003 | Kraft et al. |
| 2003/0072429 | A1 | 4/2003 | Slobodin et al. |
| 2003/0099406 | A1 | 5/2003 | Georgiev et al. |
| 2003/0147465 | A1 | 8/2003 | Wu et al. |
| 2003/0159141 | A1 | 8/2003 | Zacharias |
| 2004/0017164 | A1 | 1/2004 | Belliveau |
| 2004/0027593 | A1 | 2/2004 | Wilkins |
| 2004/0096200 | A1 | 5/2004 | Chen et al. |
| 2004/0131261 | A1 | 7/2004 | Lee et al. |
| 2004/0210845 | A1 | 10/2004 | Paul et al. |
| 2004/0223747 | A1 | 11/2004 | Otala et al. |
| 2005/0018082 | A1 | 1/2005 | Larsen et al. |
| 2005/0174430 | A1 | 8/2005 | Anderson |
| 2005/0231511 | A1 | 10/2005 | Doepke et al. |
| 2006/0092159 | A1 | 5/2006 | Ford et al. |
| 2006/0156240 | A1 | 7/2006 | Lemay et al. |

FOREIGN PATENT DOCUMENTS

JP         2000101910 A     6/2001

OTHER PUBLICATIONS

International Search Report issued Aug. 19, 2010 for corresponding PCT Application No. PCT/US2010/020200.

* cited by examiner

TRANSITIONING BETWEEN TWO HIGH RESOLUTION IMAGES IN A SLIDESHOW

BACKGROUND

Video and still images can be stored digitally in a wide variety of formats on a wide variety of storage media. For example, still images can be stored as electronic image files according to the Joint Photographic Experts Group (JPEG) format. The JPEG file of the image can then be accessed and displayed on a computer or other video monitor.

Similarly, video can be stored digitally according to the Motion Picture Experts Group (MPEG) standard formats. Video can also be transmitted as MPEG data. The MPEG video can then be replayed on, for example, a computer, a television, or other video monitor.

Digitally stored video and still images may have varying degrees of resolution or image quality. The higher the resolution or image quality, the more data is stored for the images.

Video and still images can be stored on a variety of storage media. For example, digital video and still images can be stored on a hard drive, a floppy disk, a compact disk (CD), a Digital Versatile (or Video) Disk (DVD), or a memory card.

SUMMARY

A method of transitioning between two high resolution images in a slideshow includes replacing a first image with a lower resolution copy of that first image and fading out the lower resolution copy of the first image to reveal a second image.

In another embodiment, a system for transitioning between two high resolution images in a slideshow includes a video chip having a first video buffer for containing a first image, a second video buffer for containing a second image, and a graphic buffer for containing a lower resolution copy of the first image. The chip is configured to replace the first image with the lower resolution copy of the first image and fade out the lower resolution copy of the first image to reveal the second image.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

Figure 1:
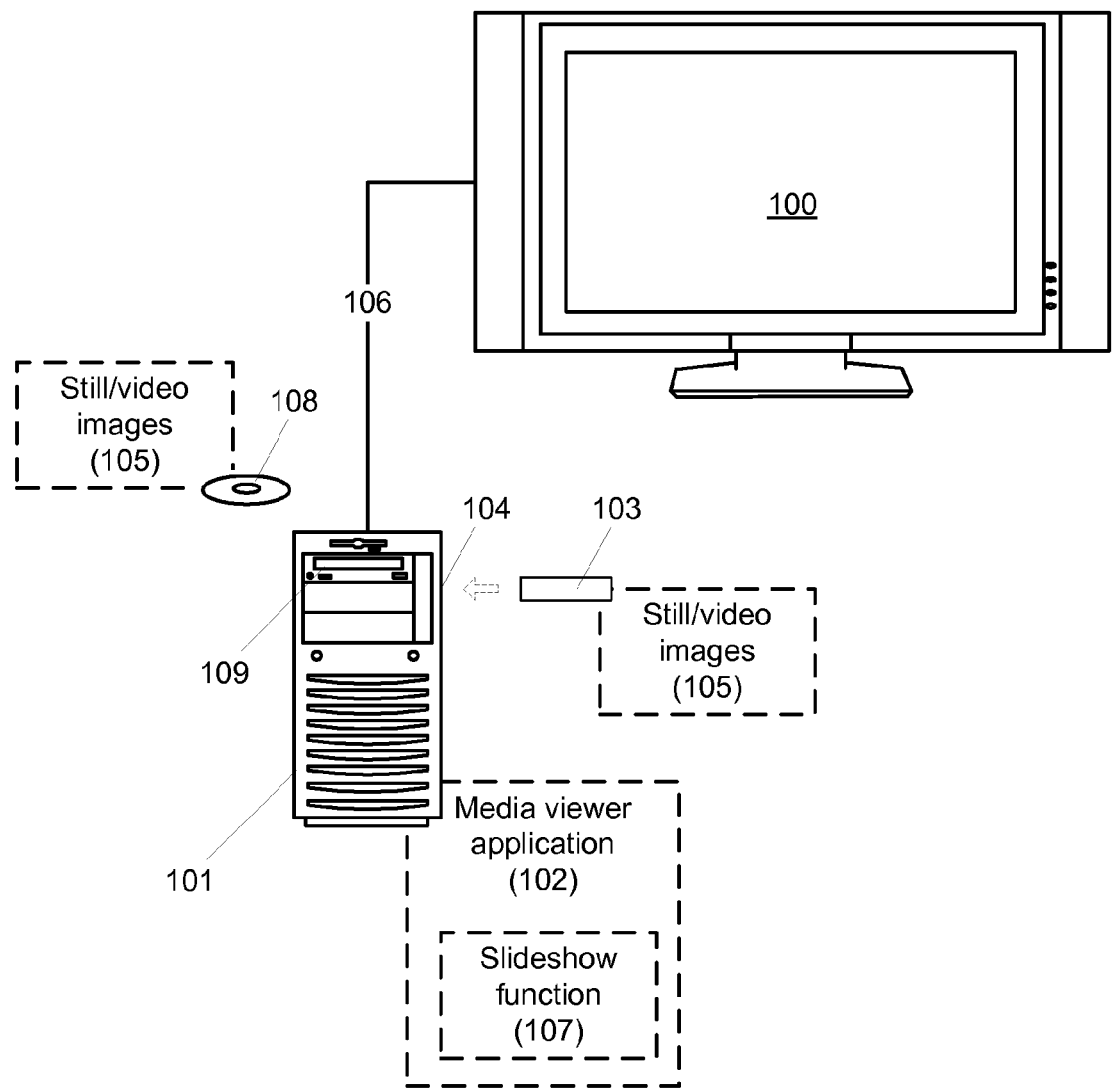
FIG. 1 illustrates a first system in which a media viewer application is used to display images on a monitor with an improved transition between high resolution images according to the principles described herein.

FIG. 1 illustrates a system that can store and display both video and still images. As shown in FIG. 1, the system includes a television or video monitor (100). This monitor (100) may be any device that can display still or video images, including for example, a cathode ray tube set, a liquid crystal display, a plasma television, etc.

A computer (101) is connected to the monitor (100). A connection (106) between the computer (101) and the monitor (100) allows the computer (101) to send image data, still or video, to the monitor (100) for display. As used herein, the term "image data" will be understood to refer broadly to both still image data and video or motion picture image data. The connection (106) may be, for example, a direct cable, a network connection, or a wireless connection. The computer (101) may be or include a home entertainment server.

The computer (101) includes a media viewer application (102). This application (102) is used by the computer (101) to access image data and generate an image signal that can be transmitted over the connection (106) to the monitor (100) so that the video or still images are displayed on the monitor (100). The media viewer application (102) is typically installed on the hard drive of the computer (101) and executed by the computer (101) under control of a user when the user desires to access image data for output to the monitor (100).

The media viewer application (102) includes a slideshow function (107). The slideshow function (107) can automatically access the image data on a particular storage medium and sequentially display all the still and video images recorded on that particular storage medium.

For example, the computer (101) may have a CD drive (109) for reading data from, and writing data to, a CD (108). Consequently, a CD (108) on which is recorded still and/or video images (105), may be inserted into the CD drive (109) for use by the computer (101). If the slideshow function (107) is pointed at the CD drive (109), the slideshow function (107) will access all the image data (105) on the CD (108) and will sequentially display that image data (105) on the monitor (100). Thus, a "slideshow" of the image data on the CD (108) is automatically produced.

Similarly, the computer (101) may have a port (104) for accepting a memory card (103). The memory card (103) may also have still and/or video image data (105) stored thereon.

As before, the slideshow function (107) of the media view application (102) can be pointed at the memory card (103). The slideshow function (107) will then access all the image data (105) on the memory card (103) and will sequentially display that image data (105) on the monitor (100). Thus, a "slideshow" of the image data on the memory card (103) is automatically produced.

In like manner, the slideshow function (107) may be pointed at the hard drive of the computer (101) or a particular file or file hierarchy on the hard drive of the computer (101). The slideshow function (107) will then access all the image data on the hard drive or that file structure on the hard drive and will sequentially display that image data on the monitor (100).

Figure 2:
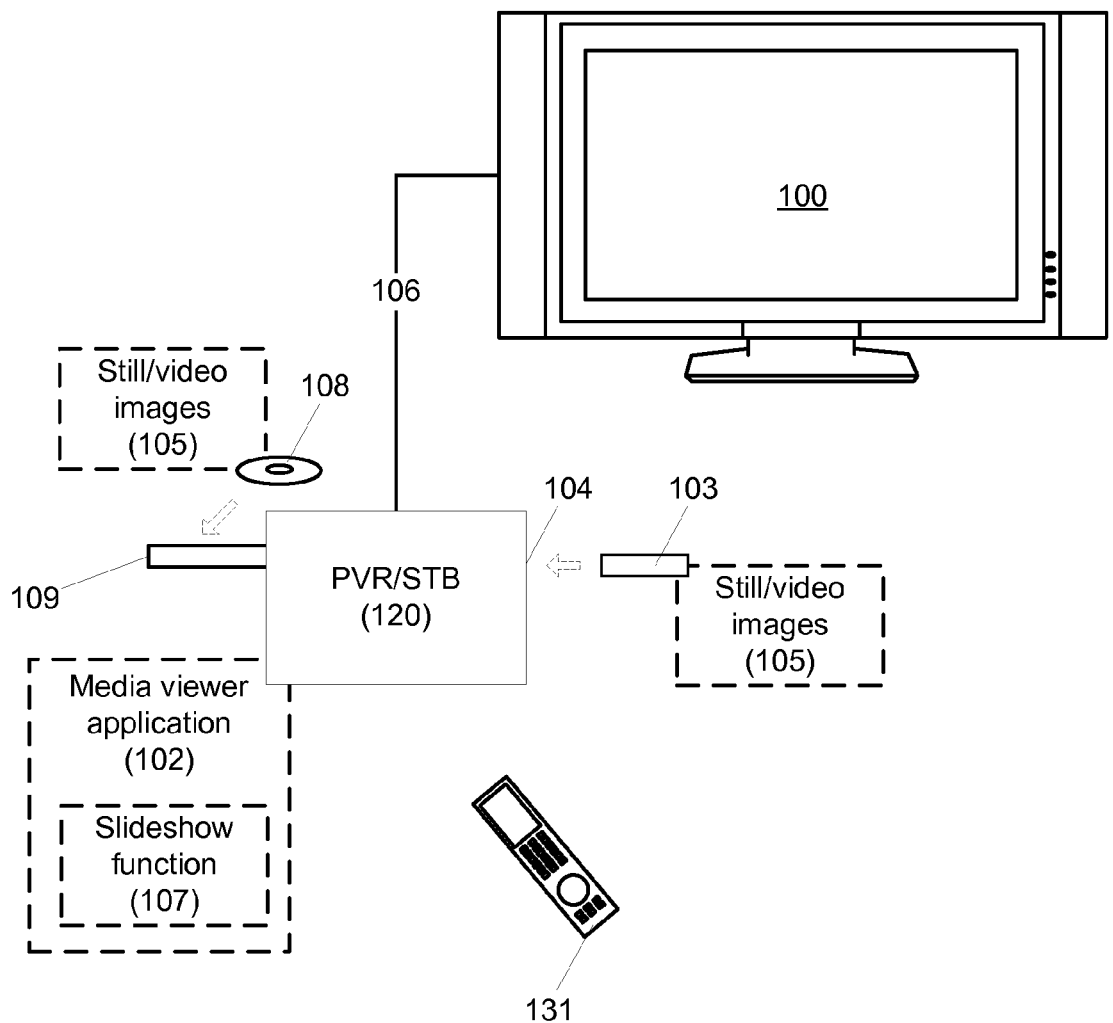
FIG. 2 illustrates a second system in which a media viewer application is used to display images on a monitor with an improved transition between high resolution images.

FIG. 2 illustrates an alternate system that also makes use of the media view application (102) and slideshow function (107) described above. As shown in FIG. 2, the monitor (100) may be connected (106) to a Personal Video Recorder (PVR) or a Set-Top Box (STB). The PVR/STB may be either a PVR or an STB or may be both.

The media viewer application (102) with the slideshow function (107) can also be installed and executed on the PVR/STB (120). While this may require some modification of the application (102) and/or slideshow function (107), the operation of the application (102) and/or slideshow function (107) remains the same.

A remote control unit (131) may be used to control the operation of the PVR/STB (120). This would include executing the media viewer application (102) and invoking the slideshow function (107). Specifically, the remote control unit (131) can be used to point the slideshow function (107) to the hard drive of the PVR/STB (120) for the retrieval and systematic display of all image data stored on the PVR/STB (120) to produce a slideshow as described above.

Similarly, the PVR/STB (120) may include a CD drive (109) and/or a memory card port (104). Consequently, as described above with respect to FIG. 1, the remote control unit (131) can be used to point the slideshow function (107) to any memory device available to the PVR/STB (120), including the a CD (108) in the drive (109) or the memory card (103) in the port (104). The slideshow function (107) will then automatically create a slideshow of the image data on that selected memory device.

Figure 3:
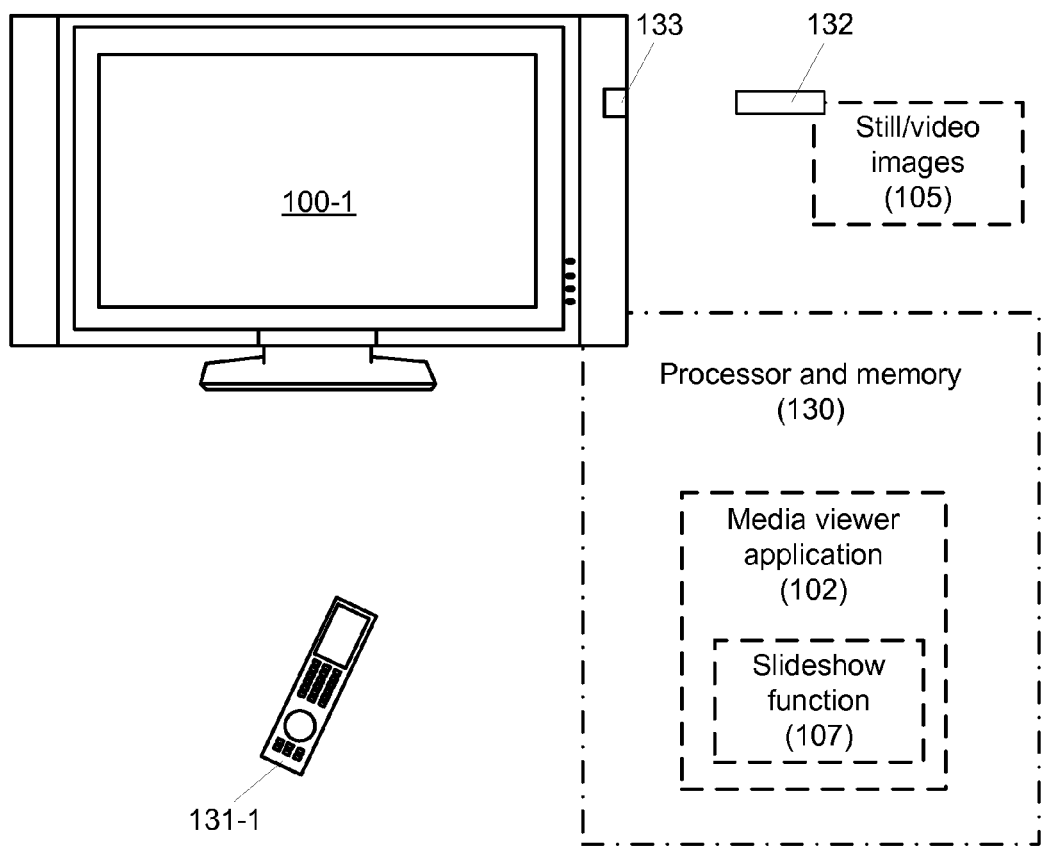
FIG. 3 illustrates a third system in which a media viewer application is used to display images on a monitor with an improved transition between high resolution images.

FIG. 3 illustrates still another system that can make use of the media viewer application (102) and slideshow function (107) described above. As shown in FIG. 3, a monitor or television set (100-1) may include a built-in port or drive (133) for accepting an image data storage medium (132). For example, the data storage medium (132) may be a memory card and the port (133) a memory card port.

A processor and memory unit (130) in the monitor (100-1) may store and execute the media viewer application (102) and the slideshow function (107) described above. Consequently, a user may execute the media viewer application (102) on the processor (130) and then invoke the slideshow function (107). The slideshow function (107) may then automatically create a slideshow as described above using the image data (105) on the storage medium (132). Alternatively, if there are more data storage media available, the slideshow function (107) can be selectively pointed to the desired storage medium, e.g., medium (132).

The monitor (100-1) may be controlled with user input device on the monitor (100-1). Additionally, a remote control unit (131-1) may be used to control the monitor (100-1) including executing the media viewer application (102) and invoking and controlling the slideshow function (107).

The slideshow function (107) described herein should provide a smooth transition or cross fade from one image file to the next on a particular storage medium. Sometimes, this transition will be from a still image to the first frame of a video clip or from the last frame of a video clip to a still image. The transition may also be between the last frame of one video clip and the first frame of a second video clip.

In the various system described above, the media viewer application makes use of video hardware to process the stored image data and output the signal used by the monitor. This hardware may be in the form of a video card or a video chip, referred to collectively herein as a video chip.

Where the images being shown are of a relatively high resolution, a video overlay function of the video chip is used. The video overlay function has the capacity to handle images, still and video, at a high resolution.

Unfortunately, many current video chips have a limited ability to alpha blend, that is to transition between two high resolution images by fading out a first image to reveal a second image. These video chips can cross fade from a high resolution to a low resolution image, from a low resolution image to a high resolution image, or from a low resolution image to another low resolution image, but cannot cross fade from a high resolution image to another high resolution image.

This presents some problems for the slideshow function (107) described herein. Preferably, the slideshow function (107) will provide a smooth transition between image data files, even when transitioning between one high resolution image and another high resolution image.

By way of example, a high resolution image may be an image of 1920 pixels by 1080 pixels. A low resolution image may be an image of 1024 pixels by 576 pixels. These examples are merely illustrative to show one example of the relative difference contemplated between high and low resolution images. A high resolution image may have more or fewer pixels than the example given. So may a low resolution image have more or fewer pixels than the example given.

To improve the transition provided by the slideshow function (107) of the media viewer application (102) between two high resolution images, the following solution can be implemented. The first high resolution image is replaced with a low resolution copy of the image during the short cross fade transition period. In this way, the function of the video chip to transition or cross fade from a low resolution image to a high resolution image is used. Because the low resolution copy of the outgoing image is displayed and then immediately faded out, the change of image quality just prior to the transition will be undetectable or, at least, not very noticeable to a user.

Figure 4:
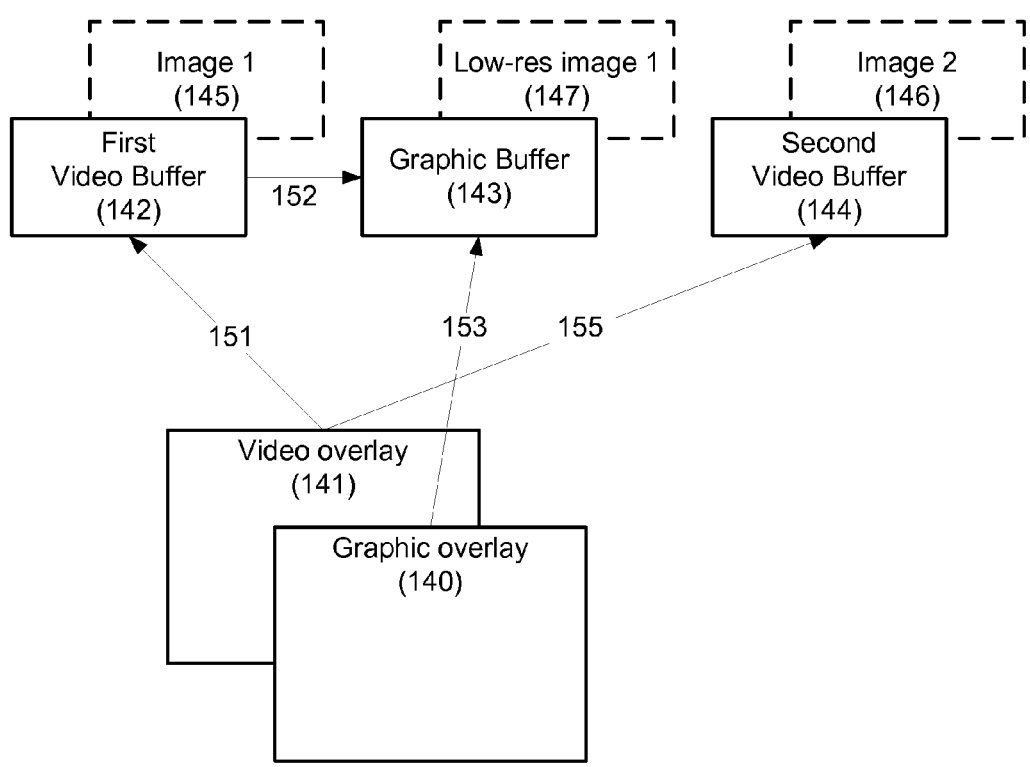
FIG. 4 illustrates the operation of a video chip providing an improved transition between high resolution images according to the principles described herein.

FIG. 4 illustrates a system for implementing the improved cross fade of the slideshow function (107) described above. As shown in FIG. 4, the first image, i.e., Image 1 (145) is a high resolution image from which it is desired to fade to another high resolution image, i.e., Image 2 (146).

Image 1 (145) is stored in a first video buffer (142) of the video chip. Image 2 (146) is stored in a second video buffer (144). The video overlay (141) is then pointed at Image 1 (145) in the first video buffer (142).

Image 1 (145) is then copied at a lower resolution to produce a low-res copy of Image 1 (147). The low-res copy of image 1 (147) is stored in a graphic buffer (143). A low resolution graphic overlay (140) is then pointed at the low-res copy of Image 1 (147) in the graphic buffer (143).

To this point, Image 1 (145) has been output and displayed by the video chip. Now, the graphic overlay (140) is enabled and the low-res copy of Image 1 (147) becomes the image output by the video chip, replacing the high resolution version of Image 1 (145).

Immediately, the video overlay (141) is pointed at Image 2 (146) in the second video buffer (144) and the video chip begins to fade out the graphic overlay of the low-res copy of Image 1 (147). Thus, Image 2 (146) gradually becomes the output of the video chip as low-res copy of Image 1 (147) is faded out.

As a result, a smooth transition between high resolution Image 1 (145) and high resolution Image 2 (146) is perceived by the viewer. Because the low-res copy of Image 1 (147) is only displayed very briefly and is quickly faded out to reveal Image 2 (146), the switch from Image 1 (145) to the low-res copy of Image 1 (147) is imperceptible or very difficult to detect and does not detract from the viewer's enjoyment of the slideshow being presented.

As will be appreciated, Image 1 (145) can be either a high resolution still image or the last frame of a video clip with high resolution. Likewise, Image 2 (146) can be either a high resolution still image or the first frame of a video clip with high resolution.

Figure 5:
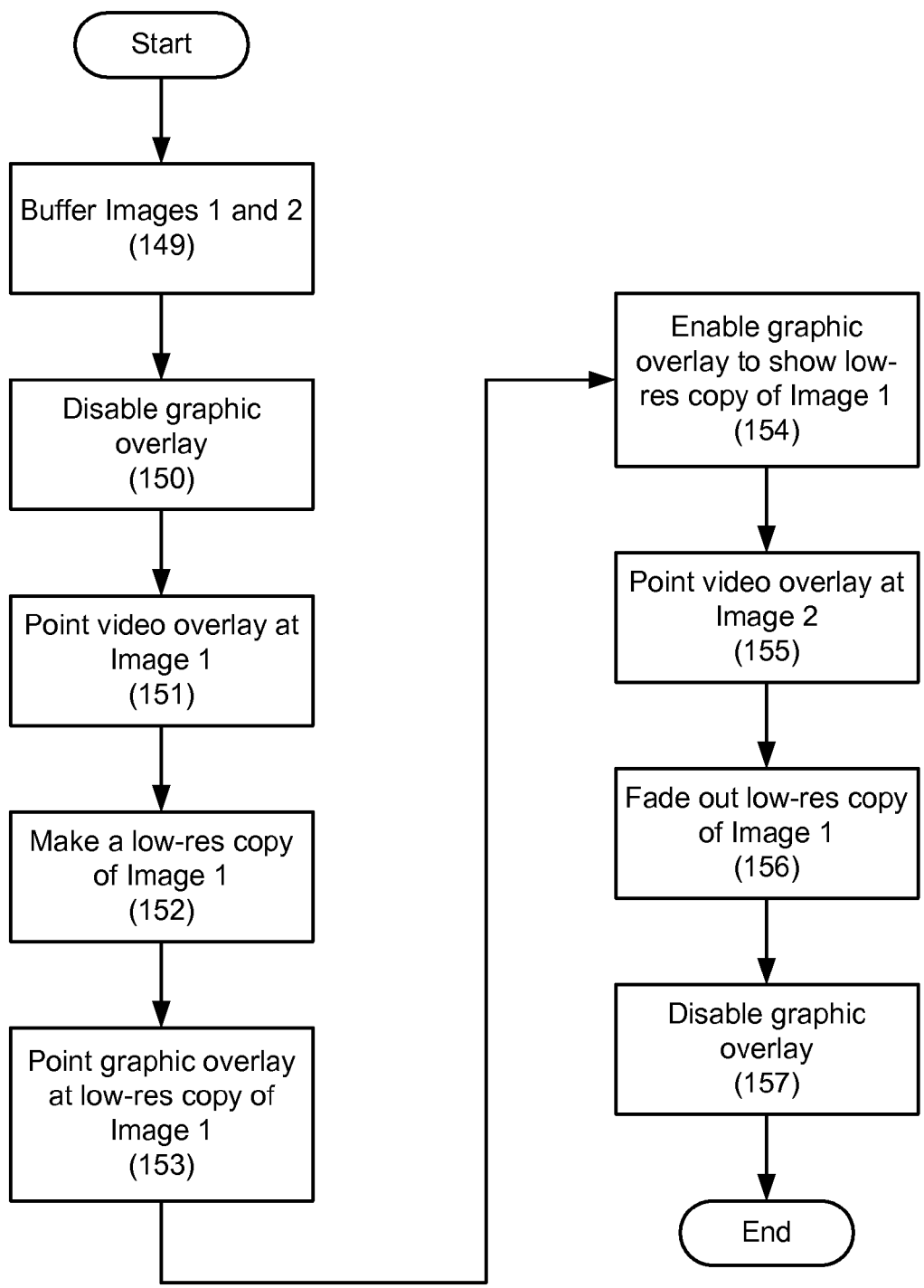
FIG. 5 is a flowchart illustrating a method of transitioning between high resolution image according to the principles described herein.

FIG. 5 is a flow chart illustrating the method implemented by the systems described above. First, Images 1 and 2 are buffered (step 149) into the first and second video buffers (142 and 144, FIG. 4). This may include centering the two images and resizing the two images to fit buffers that match the highest possible resolution that can be output by the video overlay (141, FIG. 4) of the video chip, for example, 1920 pixels by 1080 pixels.

Next, the graphic overlay (140, FIG. 4) is disabled (step 150), if active. With the graphic overlay disabled, the video overlay (141, FIG. 4) is pointed (step 151) at Image 1 in the first video buffer. Thus, Image 1 becomes the output of the video chip and is displayed.

A low resolution copy of Image 1 is then produced (step 152). The low-res copy of Image 1 is stored in a graphic buffer (143, FIG. 4). The disabled graphic overlay is then pointed (step 153) at the low-res copy of Image 1 in the graphic buffer.

When the graphic overlay is then enabled (step 154), the low-res copy of Image 1 is laid over the original Image 1 and becomes the output of the video chip. The alpha blending function of the video chip is set to "all graphic" at this point.

The video overlay then is pointed (step 155) at Image 2 (146, FIG. 4) in the second video buffer. Thus, behind the graphic overlay, Image 2 replaces Image 1.

The alpha blending function of the video chip is then invoked to fade out (step 156) the low-res copy of Image 1 in the graphic overlay to reveal the high resolution Image 2 in the underlying video overlay. When the fade out is complete, the alpha blending function of the video chip is set to "all video." The graphic overlay may again be disabled (step 157).

As a result, a smooth transition between high resolution Image 1 (145) and high resolution Image 2 (146) is perceived by the viewer. Because the low-res copy of Image 1 (147) is only displayed very briefly and is quickly faded out to reveal Image 2 (146), the switch from Image 1 (145) to the low-res copy of Image 1 (147) is imperceptible or very difficult to detect and does not detract from the viewer's enjoyment of the slideshow being presented.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. An apparatus for transitioning between two high resolution images in a slideshow comprising:
    a video chip, said video chip comprising:
        a first video buffer for containing a first image;
        a second video buffer for containing a second image; and
        a graphic buffer for containing a lower resolution copy of said first image;
    a video overlay for initially displaying said first image prior to said replacing of said first image; and
    a graphic overlay for displaying said lower resolution copy of said first image such that said lower resolution copy of said first image completely covers said first image,
    wherein said chip is configured to:
        display said first image from said first video buffer on a display device,
        replace said first image with said lower resolution copy of said first image by covering said display of said first image with said graphic overlay of said lower resolution copy of said first image, and
        fade out said lower resolution copy of said first image to reveal said second image.

2. The apparatus of claim 1, wherein said chip is further configured to make said lower resolution copy of said first image and store said lower resolution copy of said first image in a graphic buffer.

3. The apparatus of claim 1, wherein said chip is further configured to point said video overlay at said second image before fading out said lower resolution copy of said first image to reveal said second image.

4. The apparatus of claim 1, wherein said first image is a still image.

5. The apparatus of claim 1, wherein said first image is a frame of a video clip.

6. The apparatus of claim 1, wherein said second image is a still image.

7. The apparatus of claim 1, wherein said second image is a frame of a video clip.

8. A computer program product for transitioning between two high resolution images in a slideshow, the computer program product comprising:
    a computer useable medium having storing processor-readable instructions the processor readable instruction comprising:
    a media viewer application, said application comprising a slideshow function, wherein said slideshow function, when invoked, automatically displays a sequence of images stored on a selected storage medium to produce a slideshow,
    wherein said slideshow function is configured to replace a first image with a lower resolution copy of said first image and then fade out said lower resolution copy of said first image to reveal a second image.

9. The computer program product of claim 8, wherein said slideshow function is configured to operate a video overlay for initially displaying said first image prior to said replacing of said first image.

10. The computer program product of claim 8, wherein said slideshow function is configured to make said lower resolution copy of said first image and store said lower resolution copy of said first image in a graphic buffer.

11. The computer program product of claim 8, wherein said slideshow function is configured to operate a graphic overlay for displaying said lower resolution copy of said first image over said first image such that said lower resolution copy of said first image completely covers said first image.

12. The computer program product of claim 11, wherein said slideshow function is configured to point a video overlay at said second image before fading out said lower resolution copy of said first image to reveal said second image.

13. The computer program product of claim 8, wherein said first image is a still image.

14. The computer program product of claim 8, wherein said first image is a frame of a video clip.

15. The computer program product of claim 8, wherein said second image is a still image.

16. The computer program product of claim 8, wherein said second image is a frame of a video clip.

17. An apparatus for displaying images stored on a storage medium, said system comprising:
    a device for reading a data storage medium and outputting a signal to a video display; and
    a media viewer application operational with said device for reading said data storage medium, wherein said media viewer application further comprises a slideshow function that, when invoked, automatically displays images stored on said data storage medium to produce a slideshow;

wherein said slideshow function is configured to replace a first image with a lower resolution copy of said first image and then fade out said lower resolution copy of said first image to reveal a second image.

18. The apparatus of claim 17, wherein said device for reading said data storage medium comprises a computer.

19. The apparatus of claim 17, wherein said device for reading said data storage medium comprises a personal video recorder.

20. The apparatus of claim 17, wherein said device for reading said data storage medium comprises a set-top box.

21. The apparatus of claim 17, wherein said device for reading said data storage medium is incorporated into said video monitor.

22. The apparatus of claim 17, wherein said device for reading a data storage medium is a compact disk drive.

23. The apparatus of claim 17, wherein said device for reading a data storage medium is a memory card port.

24. The apparatus of claim 17, wherein said slideshow function is configured to operate a video overlay for initially displaying said first image prior to said replacing of said first image.

25. The apparatus of claim 17, wherein said slideshow function is configured to make said lower resolution copy of said first image and store said lower resolution copy of said first image in a graphic buffer.

26. The apparatus of claim 16, wherein said slideshow function is configured to operate a graphic overlay for displaying said lower resolution copy of said first image over said first image.

27. The apparatus of claim 26, wherein said slideshow function is configured to point a video overlay at said second image before fading out said lower resolution copy of said first image to reveal said second image.

* * * * *

UNITED STATES PATENT AND TRADEMARK OFFICE
CERTIFICATE OF CORRECTION

| | | |
|---|---|---|
| PATENT NO. | : 7,855,724 B2 | Page 1 of 1 |
| APPLICATION NO. | : 12/191242 | |
| DATED | : December 21, 2010 | |
| INVENTOR(S) | : Tonni Sandager Larsen et al. | |

It is certified that error appears in the above-identified patent and that said Letters Patent is hereby corrected as shown below:

Column 6, lines 17 through line 31 should read as follows:

Claim 8. A computer program product for transitioning between two high resolution images in a slideshow, the computer program product comprising:

a computer useable medium having storing processor-readable instructions, the processor readable instruction comprising:

a media viewer application, said application comprising a slideshow function, wherein said slideshow function, when invoked, automatically displays a sequence of images stored on a selected storage medium to produce a slideshow;

a video overlay for initially displaying said first image prior to said replacing of said first image; and a graphic overlay for displaying said lower resolution copy of said first image such that said lower resolution copy of said first image completely covers said first image, wherein said slideshow function is configured to replace a first image with said lower resolution copy of said first image and then fade out said lower resolution copy of said first image to reveal a second image.

Signed and Sealed this
Eighth Day of May, 2012

David J. Kappos
*Director of the United States Patent and Trademark Office*